March 11, 1941. L. E. RENO 2,234,534
PALMETTO CUTTING AND ROOT EXTERMINATING MACHINE
Filed Nov. 27, 1939 3 Sheets-Sheet 3

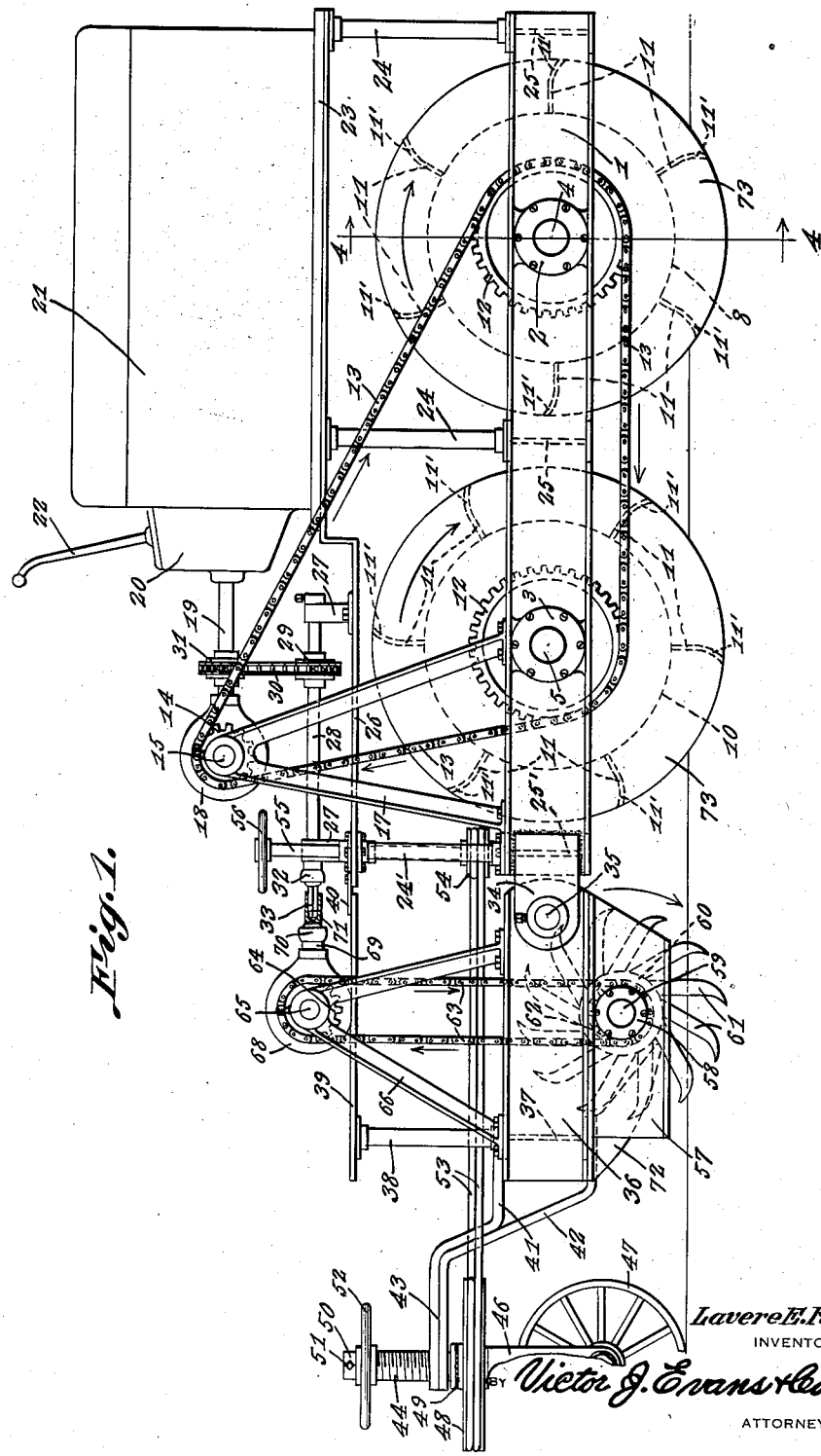

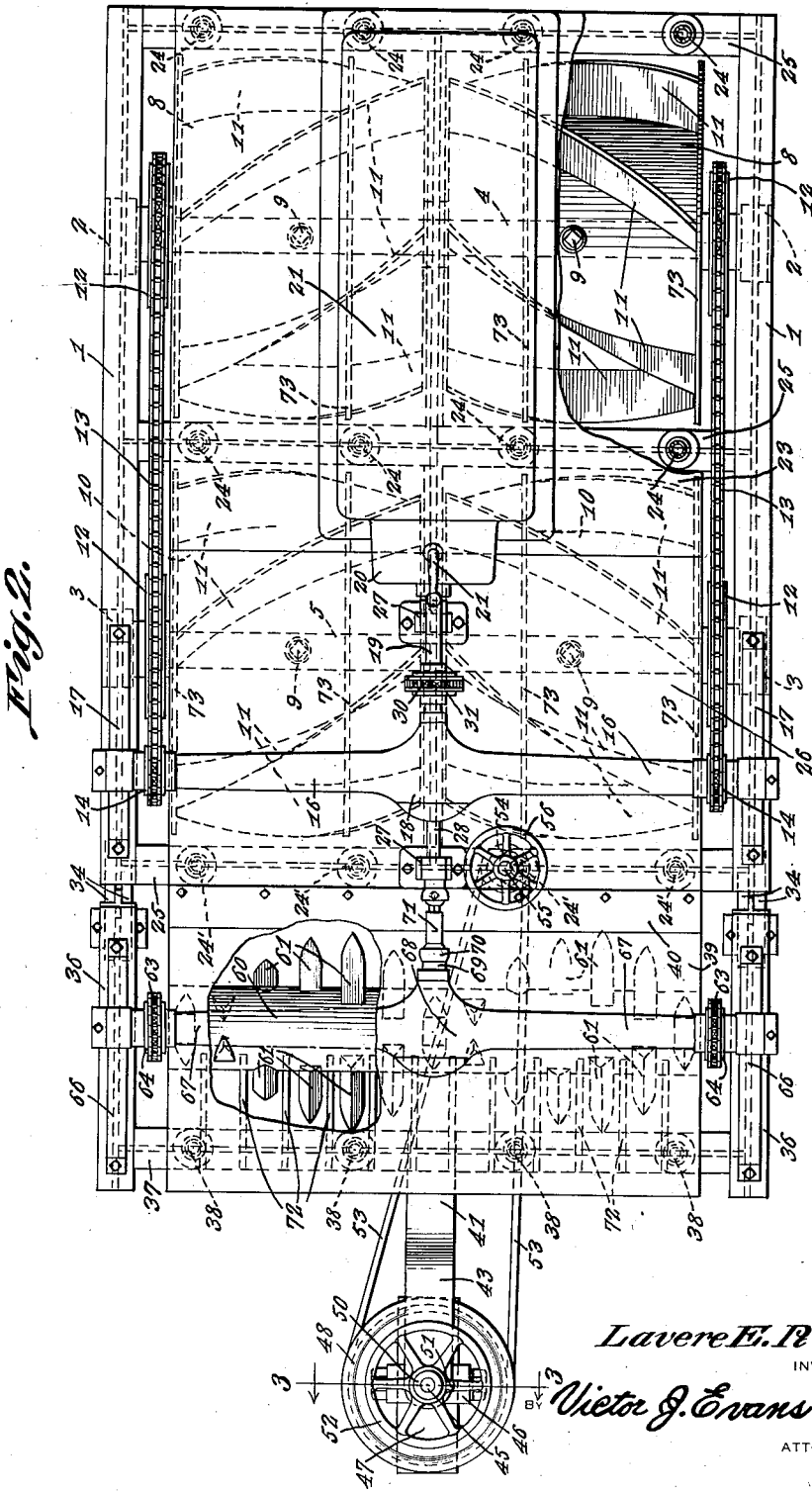

Lavere E. Reno, INVENTOR
BY Victor J. Evans & Co.
ATTORNEYS

Patented Mar. 11, 1941

2,234,534

UNITED STATES PATENT OFFICE 2,234,534

PALMETTO CUTTING AND ROOT EXTERMINATING MACHINE

Lavere E. Reno, Sarasota, Fla.

Application November 27, 1939, Serial No. 306,356

9 Claims. (Cl. 97—40)

This invention relates to machines for the cutting of low growth, above surface vegetation and stubble and also for below surface root extermination, and, without limitation thereto, has more particularly to do with the extermination of wild growth palmetto and the like in the preparation of land for agricultural cultivation, grazing, reforestation and other purposes.

The principal object of the invention is to produce a practical and highly efficient machine for effectively severing stubble, low growth palmetto, and other wild vegetation above the surface of the ground and, in connection with such severing action, digging into the the ground with root lifting and extracting effect.

A particular object is to incorporate the cutting and extracting elements of the machine in a unitary motor-driven vehicle or tractor and driving the respective cutting and extracting elements under the power of a common motor unit and arranging the cutting elements so as to constitute a part of the propulsion means of the tractor.

A further object is to provide practical means of adjustment and compensation in the correlated working parts to accommodate the machine to different soil conditions and the particular vegetation to be exterminated.

With the foregoing and other objects and advantages to be attained as will hereinafter more fully appear, the invention consists in the novel general structure and in the particular parts and combinations and arrangements of parts thereof as hereinafter described and set forth in the appended claims, reference being had to the accompanying drawings illustrating a practical adaptation of the invention, in which—

Figure 1 is a right side elevation of the machine;

Figure 2 is a top plan view;

Figure 4:
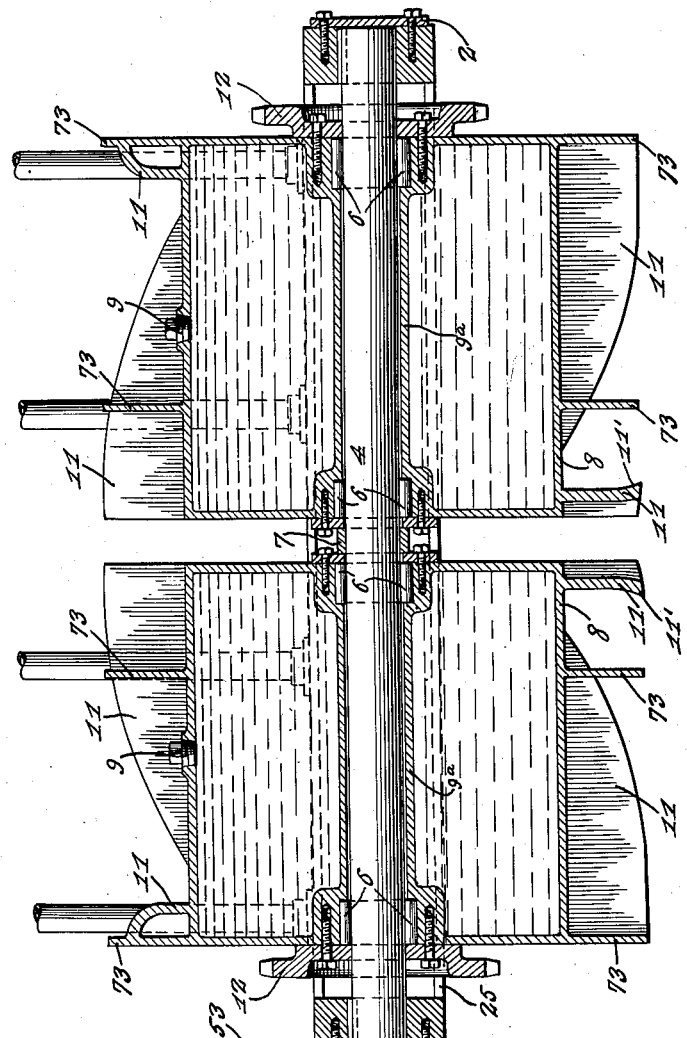
Figure 4 is an enlarged vertical cross section taken on or about the line 4—4 of Figure 1.

Referring now to the drawings, the numeral 1 designates the main body or underframe of the machine, the longitudinal side members of which are preferably of I-beam section, said frame side members being provided near the front end of the machine with a pair of rigid supporting blocks 2 having transverse bores and rearwardly therefrom with a second pair or similar blocks 3. Supportedly fitted at its opposite end portions in the bores of the blocks 2 and keyed to prevent it from rotating therein is an axle shaft 4, and a similar shaft 5 is likewise supported in the blocks 3.

Mounted freely rotatable on the axle shaft 4, between the outer longitudinal members of the main body or underframe 1 and provided with antifriction bearings 6 within their opposite ends and with an end thrust collar 7 located therebetween on the middle portion of the shaft, is a pair of cylindrical drums 8, said drums being provided with filler openings in the peripheral wall thereof, as shown, or at any other desirable location, and normally closed by removable plugs 9 whereby the drums may be filled with water, sand or other loose and flowable material to increase the weight of the drums for a purpose to be hereinafter more fully described. A pair of similar drums 10 are mounted rotatably on the axle shaft 5, it being understood that said drums 8 and 10 are each provided with a core tube 9ª either formed integrally with the bearing hub portions thereof as shown in Figure 4 or obviously otherwise formed and provided for making the drums leaktight.

The drums 8 and 10 constitute traction rollers for the machine as well as functioning as cutting elements, for which latter purpose the drums are provided with circumferential blades 11 which extend in a general radial direction but in a spiral arrangement from end to end of the drums, the blades 11 of the two drums 8 and 10 at one side of the longitudinal axis of the body frame 1 being in an order the reverse of those on the companion drums at the opposite side of the frame, this arrangement being made to avoid any tendency of the machine to shift laterally and to insure substantially straight lineal normal tracking of the machine during the propulsion thereof. During the travel of the machine these spiral blades have a shearing effect upon the stubble, palmetto or other growth above surface and they also, under the combined weight of the filled drums themselves and the body frame and elements carried thereon, dig into the soil so as to cut the roots and at the same time having an extractor effect, which latter effect is augmented and more fully carried out by special supplemental extractor means to be later more fully described.

The respective drums 8 and 10 are spaced at their outer ends from the adjacent longitudinal members of the main body or underframe 1, the spacing being to accommodate sprocket gears 12 which are fixed on the outer end hub portions of the drums. The two sprocket gears 12 at each side of the machine are connected by an endless chain 13 to a smaller gear 14 provided therefor on the adjacent end portion of a conventional differential jackshaft 15, which latter (not shown in detail) obviously comprises two separate longitudinally alined sections and is mounted in an ordinary housing 16 and supported at its opposite ends on upstanding bracket frames or standards 17 located on the adjacent longitudinal side members of the main body or underframe 1 near the rear ends thereof, the gears 14 being located between said standards 17 and the adjacent end portions of the housing 16 of the jackshaft 15.

The middle portion of the jackshaft housing 16 is enlarged in the usual manner, as at 18, to accommodate the differential driving gear (not shown) to which the inner ends of the jackshaft sections are respectively keyed, the differential gear being connected by a regular propeller shaft 19 through a regular transmission mechanism, not specifically illustrated but merely indicated conventionally, as at 20, to the crank or other driving shaft of any regular internal combustion engine in any suitably arranged unit not shown in detail but merely indicated conventionally, as at 21, each and all of said conventionally indicated parts being of any obvious and well known construction and arrangement and in themselves forming no part of the present invention except in the general provision thereof as hereinafter described and set forth in the appended claims. Also, suffice it to say that the transmission mechanism 20 is provided with the usual controlling lever 22.

It is here noted that in the general frame structure of the machine an upper platform 23 is mounted on supporting columns 24 which are located at suitable intervals on transverse frame members 25, one of which latter is located at the front end of the main body or underframe 1 and the other midway between the pairs of drums 8 and 10. The portion of the platform 23 rearward from the motor unit 21 is stepped downwardly, as at 26, said portion 26 being supported at its rear end on columns 24' located on the rearmost cross frame member 25'. Journaled in supporting bearings 27 provided on the platform portion 26, is a countershaft 28 having a sprocket gear 29 thereon which is connected by a chain 30 to a driving gear 31 provided therefor on the propeller shaft 19, whereby said countershaft 28 is driven by and simultaneously with said propeller shaft 19. The countershaft 28 is provided at its outer end with a conventional universal joint 32, from which latter a stubshaft member 33 of square or other polygonal cross section extends, this latter member being provided for a combined longitudinally slidable and swingable driving connection to be presently more fully described.

Extending rearwardly from the inner end portions of the longitudinal side members of the main body or underframe 1 are bracket members 34 which pivotally support, as at 35, a trailer frame 36, which latter comprises longitudinal side members which are preferably of the same I-beam form as the corresponding members of the main body or underframe 1, said trailer frame having a transverse rear end member 37, on which latter supporting columns 38 are provided for a platform 39 which is normally alined substantially in the same horizontal plane as the depressed platform portion 26 of the main body frame 1 of the machine, there being provided a suitable flexible and yieldable connection 40 between the meeting ends of said platform portions 26 and 39 to compensate for up and down swinging movement and adjustment of the trailer frame 36, as will later more fully appear.

Extending rearwardly from and medially of the trailer frame 36 are a pair of upper and lower tongues 41 and 42, which are turned upwardly from the frame 36 and thence horizontally in engagement with each other, as at 43, in a plane somewhat above the top of said frame 36. Near their outer ends the overlapped upper extensions 43 of the tongues 41 and 42 are provided with registered screw-threaded openings in which an externally screw-threaded sleeve member 44 is received, said sleeve member 44 being fitted to rotate on a round shank portion 45 extending upwardly from a yoke 46 in which is journaled a casterlike steering wheel or roller element 47, which latter rides on the ground and supports the rear portion of the trailer frame 36.

Figure 3:
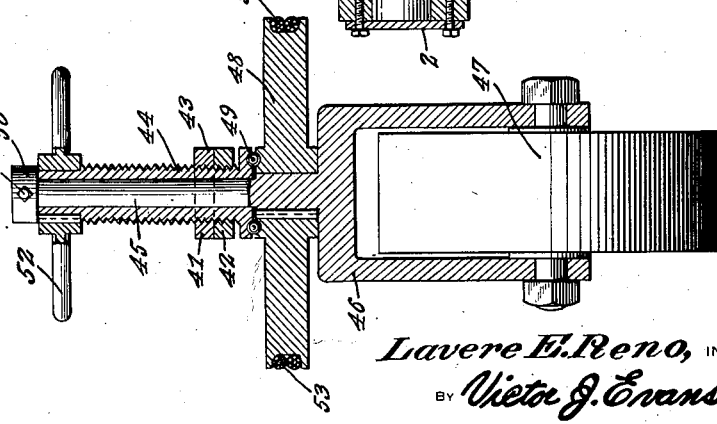
Figure 3 is a vertical section, on an enlarged scale, taken on or about the line 3—3 of Figure 2.

Keyed or otherwise fixed on the lower portion of the shank 45, so as to rotate therewith, is a circumferentially grooved circular disk 48, against the top of the hub portion of which said externally screw-threaded member 44 abuts with an interposed antifriction bearing as indicated at 49 and shown more clearly in Figure 3 of the drawings. The upper end of the sleeve member 44 abuts an end thrust collar 50 which is fixed on the upper end portion of the shank 45 by a setscrew 51 or other suitable fastening means. By this provision the sleeve member 44 is held against endwise movement on the shank 45 but is free to rotate thereon, its rotation being effected by means of a hand wheel 52 keyed or otherwise secured on the upper end portion of said sleeve member 44. Thus, with the casterlike wheel or roller 47 in engagement with the ground the turning of the sleeve member 44 on the shank 45 effects the raising and lowering of the trailer frame 36 about the axis of its pivotal support 35 due to the screw-threaded engagement of the overlapped tongue extension 43 with said externally screw-threaded sleeve member 44.

With the trailer frame 36 vertically adjusted as just above described, the steering of the machine in its propulsion under the power driven drums 8 and 10, is effected by means of a belted connection 53, such as a cable, chain or the like, between the circumferentially grooved disk 48 and a driving pulley 54 provided on the lower portion of a steering column 55 mounted on the rear transverse member 25' of the main body or underframe and having a hand wheel 56 at its upper end. The belted cable or chain 53 is entwined about the disk 48 and pulley 54 in any suitable manner to secure a positive driving connection between said disk and pulley and the steering of the traveling machine is readily effected by manipulation of the hand wheel 56 by the operator to turn the casterlike wheel or roller 47 in a direction either right or left, at will. In this connection it is here pointed out that due to the mounting of the drums 8 and 10 separately on the shafts 4 and 5 so as to rotate independently of each other, except as the front and rear drums at each side of the machine are connected by the sprocket chains 13 to the respective sections of the jackshaft 15, and also due to the differential driving gear of said shaft sections, the turning of the entire machine within a short radius is easily accomplished.

The longitudinal side members of the trailer frame 36 are provided on their under sides with supplemental channel or I-section members 57 which are riveted, welded or otherwise secured thereto. Each of the supplemental frame members 57 is provided with a supporting block 58, said blocks 58 carrying the ends of a non-rotatable shaft 59 on which is rotatably mounted a pair of longitudinally alined cylindrical tubular core sections 60 of a special extractor element which cooperatively follows the drums 8 and 10 in the operation of the machine.

As shown, the extractor element comprises a plurality of circumferential spike members 61 which are arranged in staggered relation to each other and spirally about each core section 60, said spikes being tangentially disposed rather than directly radial from the circumference of the core and being preferably curved and sharpened at their outer ends and extended in a direction forward of their leading sides and their leading sides being preferably beveled to provide a cutting edge substantially the entire length thereof. By this form and arrangement of the spike elements 61 said elements dig readily into the ground when moved rotatably under power as will presently more fully appear, and move in a circular path rearwardly with respect to the line of travel of the machine and upwardly from the soil with a hooked lifting effect which readily brings the severed roots to and above the surface of the ground. In this connection, it is here also noted that the spiral blades 11 of the respective drums 8 and 10 are also preferably curved forwardly of their leading sides, as at 11', which form and arrangement adds materially to the cutting and soil penetrating and digging effect of said blades 11.

For driving the special extractor element, its core sections 60 are respectively provided at their outer ends, near the supporting blocks 58 with sprocket gears 62 which are connected by chains 63 to driving gears 64 provided on the outer end portions of a jackshaft 65 which is supported at the upper ends of upstanding bracket frames or standards 66 mounted on the longitudinal side members of the trailer frame 36. This jackshaft 65, which is similar to the hereinbefore described jackshaft 15 by which the drums 8 and 10 are driven, is provided with a conventional housing 67 formed at its middle with an enlargement 68 which houses a conventional differential or other suitable driving gear (not shown) to which the shaft sections are keyed, said driving gear being obviously provided with a stub shaft 69 which is connected by a conventional universal joint 70 to a counterpart socketed stub extension 71 which receives with longitudinally slidable but rotatably interlocked effect the hereinbefore described stubshaft member 33 which is connected by the universal joint 32 to the countershaft 28. By this provision, the jackshaft 65 is driven by the countershaft 28 in whatever vertically adjusted position the trailer frame 36 may be, and the special extractor unit being accordingly driven positively with a digging effect to a predetermined depth in the soil for which the necessary adjustment has been made by manipulation of the hand wheel 52 on the adjusting sleeve member 44 on the shank portion 45 of the yoke 46 in which the casterlike steering wheel or roller 47 is mounted.

The provision of the two separate toothed rotors of the trailing extractor rotatable independently of each other on the supporting shaft 59, with the chain and sprocket connection 63 between said rotors and the respective sections of the differentially geared jackshaft 65, also facilitates the steering of the machine and the easy turning thereof as does the similar mounting and driving provision for the drums 8 and 10 as hereinbefore stated.

While the power driven rotary extractor element with the arrangement of fingers or spike members 61 as hereinabove described is alone practically effective in its digging and root lifting action, it is preferable to provide in correlation to said elements a series of spaced, forwardly projected, pointed, bladelike fingers or stripper members 72 between which the respective fingers or spike members 61 pass in their travel upwardly from the ground, the effect being to further sever or break up into smaller pieces the roots which are extracted from the soil and brought up against the under edge portions of said bladelike fingers or stripper members 72 by the beveled leading edge portions of said fingers or spike members 61.

A machine of the character herein described is highly efficient particularly in the extermination of wild low growth palmetto or vegetation of like character which is more or less tough in character, because of the peculiar spirally arranged blade members 11 on the drums 8 and 10 and the provision for variably weighting the drums by the placing of water, sand or other flowable material therein and the machine being capable of further weighting by the placing of separate weight elements on the upper platform portions 23 and 26 above the drums. It is here also noted that it is preferable to provide the drums with annular cutting blades 73, spaced apart and in any desirable number thereof. In the illustrated structure, each drum 8 and 10 is provided with a pair of these blades 73. In some cases, however, these annular blades 73 may be eliminated although it is preferable to provide them as shown to have a cutting effect in addition to the spirally arranged blades 11.

The propulsion of the machine through the means for positively driving the drums 8 and 10 is obviously controlled by the transmission control lever 22, and, by the sprocket and chain connection between the propeller shaft 19 and countershaft 28, the operation of the special extractor elements 60 following the drums 8 and 10 is also simultaneously accomplished. Obviously, for practical purposes, although in itself not an essential part of the present invention, special clutch means (not shown) may be provided whereby the driving chains 13, 30 and 63 may be rendered inactive, at will, whereby the propeller shaft 19 may rotate, if desired, without actuating either the drums 8 and 10 or the special extractor elements 60, or the drums may be operated while the extractor elements 60 remain idle and vice versa.

While the machine is designed more particularly for the extermination of palmetto it is obvious that it is also adaptable for cutting and exterminating the stubble of corn and sugar cane and other stubble in the preparation of soil for agricultural cultivation, grazing or reforestation purposes. It is also obvious that while the machine illustrated in the accompanying drawings embodies a practical adaptation of the present invention, considerable modification and alteration may be made therein without departing from the spirit and scope of the invention as defined by the appended claims. The invention, therefore, is not limited to the specific construction and arrangement shown.

What is claimed is:

1. In a cutting and root exterminating machine of the character described, a tractor having a driving motor unit thereon, said machine being tractively supported on drums having spirally arranged circumferential cutting-and-digging blades, and a trailing, vertically adjustable, rotary extractor element having a plurality of circumferential soil-entering spike members to engage and extract roots from the soil over which said drums have passed.

2. In a cutting and root exterminating machine of the character described, a tractor having a driving motor unit thereon, said machine being tractively supported on drums having spirally arranged circumferential cutting and digging blades, and a trailing, vertically adjustable, rotary extractor element having a plurality of circumferential soil-entering spike members to engage and extract roots from the soil over which said drums have passed, the cutting edge portions of the circumferential blades of said drums being turned ahead of the leading sides of the blades and the spike members of said trailing extractor also having their outer end portions turned in advance of their leading sides.

3. In a cutting and root exterminating machine of the character described, a tractor having a driving motor unit thereon, said machine being tractively supported on drums having spirally arranged circumferential cutting and digging blades, and a trailing, vertically adjustable, rotary extractor element having a plurality of circumferential soil-entering spike members to engage and extract roots from the soil over which said drums have passed, the spike members of said trailing extractor being arranged spirally about the core of the extractor and having their outer end portions sharpened and turned forwardly of their leading sides.

4. In a cutting and root exterminating machine of the character described, a tractor having a driving motor unit thereon, said machine being tractively supported on drums having spirally arranged circumferential cutting and digging blades, and a trailing, vertically adjustable, rotary extractor element having a plurality of circumferential soil-entering spike members to engage and extract roots from the soil over which said drums have passed, the spike members of said trailing extractor being arranged spirally about the core of the extractor and extended tangentially therefrom with their outer end portions sharpened and turned forwardly of their leading sides.

5. In a palmetto cutting and root exterminating machine, a tractor having a driving motor unit thereon, said tractor being tractively supported by axially alined paired drums extending transversely of the machine approximately the full width thereof, spirally arranged circumferential cutting and digging blades provided reversely on said drums, a differential driving connection between said drums and said motor unit, a trailing rotary extractor element having circumferential digging and root extracting spike members with a working range transversely of the machine substantially equal to that of the paired drums, a driving connection between said extracting element and said motor unit, and means for vertically adjusting said extractor element whereby to regulate the effective working entrance of said spike members in the soil.

6. In a cutting and root extracting machine for exterminating palmetto and the like, a tractor including a main body frame, drums constituting tractive supports for said frame, said drums having spirally arranged circumferential cutting and digging blades, a trailer frame hingedly mounted on the rear portion of said main body frame, a steering wheel having provision for adjustably supporting the rear portion of said trailer frame, a rotary extractor element mounted on said trailer frame and having spirally arranged digging and root extracting spike members thereon, a driving motor unit supported on said main body frame above said drums, a driving connection between said drums and said motor unit, a driving connection between said motor unit and said extractor, and means on said body frame for manipulating said steering wheel for controlling the direction of travel of the machine.

7. In a cutting and root extracting machine for exterminating palmetto and the like, a tractor including a main body frame, drums constituting tractive supports for said frame, said drums having spirally arranged circumferential cutting and digging blades, a trailer frame hingedly mounted on the rear portion of said main body frame, a steering wheel having provision for adjustably supporting the rear portion of said trailer frame, a rotary extractor element mounted on said trailer frame and having spirally arranged digging and root extracting spike members thereon, a driving motor unit supported on said main body frame above said drums, a driving connection between said drums and said motor unit, a driving connection between said motor unit and said extractor, forwardly extending, platelike, spaced stripper and breaker fingers on the underside of the rear portion of said trailer frame between which the spike members of said extractor element pass in their upward movement from the soil, and means on said body frame for manipulating said steering wheel for controlling the direction of travel of the machine.

8. In a machine of the character described, a tractor including a main body frame, front and rear pairs of drums tractively supporting said main body frame, said drums having spirally arranged circumferential cutting and digging blades thereon, the blades of the two drums at one side of the longitudinal axis of the machine being reversely arranged with respect to those of the companion drums at the opposite side of the longitudinal axis of the machine, said machine having a platform supported above its main body frame, a driving motor unit located on the forward portion of said platform, a transmission-controlled propeller shaft extending rearwardly from said motor unit, a jackshaft supported on said main body frame above the rear portion thereof and having a driving connection with said propeller shaft, driving connections between said jackshaft and said drums, a countershaft on said platform having a driving connection with said propeller shaft, said countershaft extending in substantial parallel relation to said propeller shaft, a stubshaft having a universal driving connection with the rear end of said countershaft, a trailer frame hingedly attached at its forward end to the rear end portion of said main body frame, a medial tongue extension at the rear end of said trailer frame, a steering wheel having an upstanding shank portion, an externally screw-threaded sleeve on said shank portion having a working engagement with said tongue extension of the trailer frame whereby the latter is supported with vertical adjustment on the steering wheel, means on said main body frame having a driving connection with the shank portion of said steering wheel whereby to control the direction of travel of the machine, at will, a rotary extractor element mounted on said trailer frame and having circumferential digging and root extracting spike members, forwardly extending spaced stripper and breaker fingers on the underside of the rear portion of said trailer frame, between which the spike members of the extractor element pass in their upward movement from the soil, a jackshaft supported on said trailer frame above said extractor element, a driving connection between said last named jackshaft and said extractor element, and a driving connection between said last named jackshaft and said countershaft on the platform of said main body frame, said driving connection including a driving stubshaft operably connected to said last named jackshaft and having a universal connection with a second driving stubshaft, the latter being longitudinally slidable but rotatably interlocked with the stubshaft which is universally connected to said countershaft.

9. The herein described above surface growth cutting and root exterminating machine, comprising a tractor including a main body frame supported on transverse paired traction drums each provided with circumferential cutting and digging blades, said drums being respectively mounted in axial alinement on opposite sides of the longitudinal axis of the main body frame with rotation independently of each other, a motor driven differential jackshaft on said main body frame having separate driving connections with the respective paired traction drums, a trailer frame connected to said main body frame and having a supporting and steering ground wheel, connectedly operable means on said main body frame for controlling and operating said supporting and steering ground wheel of the trailer frame, independently turnable paired rotary root extractor elements mounted in axial alinement on opposite sides of the longitudinal axis of said trailer frame, and a motor-driven differential jackshaft on said trailer frame having separate driving connections with said paired rotary root extractor elements.

LAVERE E. RENO.